United States Patent Office 3,065,255
Patented Nov. 20, 1962

3,065,255
PREPARATION OF DIHYDROVITAMIN $K_1$
DIPHOSPHATE ALKALI METAL SALTS
Ralph F. Hirschmann, Scotch Plains, and Arthur J. Basso,
Colonia, N.J., assignors to Merck & Co., Inc., Rahway,
N.J., a corporation of New Jersey
No Drawing. Filed Oct. 20, 1958, Ser. No. 768,007
2 Claims. (Cl. 260—461)

The present invention relates to the preparation of soluble stable dihydrovitamin $K_1$ diphosphate alkali metal salts, and more particularly to a process for preparing dihydrovitamin $K_1$ diphosphate di-alkali metal and tetra-alkali metal salts from crude dihydrovitamin $K_1$.

Dihydrovitamin $K_1$ derivatives are important medicinals since they possess vitamin K activity. It is known that vitamin K and vitamin $K_1$ are involved in the formation of prothrombin in the body which is necessary for the clotting of blood. Specifically, the alkali metal salts of dihydrovitamin $K_1$ diphosphoric acid are useful medicinally in cases of vitamin K deficiency as effective antihemorrhagic agents. In this connection, it is believed that the said alkali metal salts upon administration are converted in the body to vitamin $K_1$ and in this regard, these salts may be considered precursors of vitamin $K_1$. Unlike vitamin $K_1$ itself, however, these products are soluble in water, enabling them to be more conveniently administered to patients requiring antihemorrhagic treatment.

It has been reported in the literature that dihydrovitamin $K_1$ diphosphoric acid may be obtained by the reaction in the cold of dihydrovitamin $K_1$ with phosphorous oxychloride in pyridine. See L. F. Fieser, Chemical Abstracts, vol. 41, page 1710$i$, 1947; J. Amer. Chem. Soc., vol. 62, page 228 et seq., 1940. It has been found, however, that the alkali salts of dihydrovitamin $K_1$ diphosphoric acid, especially the tetra-alkali salts such as the tetrasodium and the tetrapotassium salts of dihydrovitamin $K_1$ diphosphoric acid, are more useful than the free acid since they are more stable and more soluble in water. Moreover, these salts are solids which are easy to handle whereas the free acid is an oil. Heretofore, in this connection, no convenient method has been provided for the preparation of these salts in such purity as would be required for pharmaceutical preparations. Hence, it can be readily appreciated that for the purpose of pharmaceutical formulation, it would be highly desirable to provide a method for the ready isolation of these salts, especially as pure solids administrable in tablet form or in concentrated aqueous solution rather than, for instance, as solutions containing unwanted impurities as well.

Accordingly, it is an object of the present invention to provide a process for producing dihydrovitamin $K_1$ diphosphate di-alkali metal salts and dihydrovitamin $K_1$ diphosphate tetra-alkali metal salts from crude dihydrovitamin $K_1$, in purified form and in favorable yields.

It is a further object of the present invention to provide a process for the ready isolation of dihydrovitamin $K_1$ diphosphate alkali metal salts as substantially pure solids.

It is still a further object of the present invention to provide substantially pure dihydrovitamin $K_1$ diphosphate alkali metal salts which are water soluble and very stable in solution.

Other and further objects will become apparent from a study of the within specification.

It has been discovered in accordance with the present invention that dihydrovitamin $K_1$ diphosphate di-alkali metal salts and dihydrovitamin $K_1$ diphosphate tetra-alkali metal salts in purified solid form may be conveniently prepared by the reaction of dihydrovitamin $K_1$ with phosphorous oxychloride in triethylamine or pyridine as catalyst in the cold to produce dihydrovitamin $K_1$ diphosphate tetrachloride, followed by hydrolysis to form dihydrovitamin $K_1$ diphosphoric acid and thereafter by conversion of the diphosphoric acid in alcohol solution with alkali metal alkoxide. The yield is advantageously improved by employing substantially pure dihydrovitamin $K_1$ diphosphoric acid in the conversion to the salt form.

Briefly, purification may be achieved by ether extraction of an alkaline solution of the impure diphosphoric acid to remove neutral contaminants followed by acidification and recovery of the purified acid from the aqueous phase by subsequent ether extraction. Alternatively, an alkaline solution of the impure diphosphoric acid may be extracted with ether and then simply treated with a cation exchange resin material which conveniently removes contaminants such as triethylamine, pyridine and attendant cations, thereby converting the alkali salt to the free acid.

The material obtained by either of these purification steps may be used directly to prepare the di-alkali metal and tetra-alkali metal salts in purified condition. Accordingly, as will appear more fully below, the diphosphoric acid is treated with the appropriate quantity of alkali metal alkoxide in alcohol and the desired salt is suitably precipitated by contacting the alcohol solution with an ether.

The instant invention, therefore, affords a simple and versatile process which permits the ready recovery of purified di-alkali metal and tetra-alkali metal salts in improved yields.

In addition to being solid in form rather than oil in form as well as being far more soluble than the diphosphoric acid, the di-alkali metal salts and the tetra-alkali metal salts are very stable in aqueous solution. Because of their greater stability, moreover, said alkali metal salts can be advantageously stored longer in the dry state. Hence, the alkali metal salts prepared in accordance with the present invention represent a convenient form of antihemorrhagic agent which may be readily administered both orally and parenterally.

The disodium salt dissolves readily in water in good concentrations to form slightly acid solutions having a pH within the range of about 5.2 to 6.8 (Beckmann pH meter) while alkaline solutions of dihydrovitamin $K_1$ diphosphate tetrasodium salt may be prepared in suitable concentrations having a pH within the range of about 10.3 to 10.8 (Beckmann pH meter). The potassium salts possess similar characteristics.

The typical stability properties possessed by the di-alkali metal and tetra-alkali metal salts in aqueous solution are demonstrated by the ultraviolet absorption spectra extinction coefficient values (E%) for the disodium and tetrasodium salts. As may be seen from the tables below, the tetra-salt is far more stable than the di-salt.

TABLE I

Solution containing 2.152 mgs. of the disodium salt per ml. of water (pH 5.8)-(Beckmann pH meter):

| Time | Temperature | E% at 235 mμ | Percent of original |
|---|---|---|---|
| 0 | | 762 | |
| 1 hr | 100° C | 511 | 67 |
| 1 day | Room temp | 725 | 95 |
| 5 days | do | 702 | 92 |
| 7 days | do | 683 | 89 |

TABLE II

Solution containing 2.146 mgs. of the tetrasodium salt per 100 ml. of water (pH 10.3)-(Beckmann pH meter):

| Time | Temperature | E% at 235 mμ | Percent of original |
|---|---|---|---|
| 0 | | 853 | |
| 1 hr | 100° C | 676 | 79 |
| 1 day | Room temp | 853 | 100 |
| 2 days | do | 846 | 99 |
| 6 days | do | 843 | 99 |
| 7 days | do | 843 | 99 |

As starting material for the preparation of dihydrovitamin $K_1$ diphosphoric acid, crude dihydrovitamin $K_1$ such as that containing about 70% to 75% dihydrovitamin $K_1$ may be used. The crude material, which may contain an anti-oxidant material since dihydrovitamin $K_1$ is very sensitive to air oxidation tending toward quinhydrone formation, is usually stored under petroleum ether or similar inert material. Thus, to prepare the crude substance for a run, the petroleum ether is removed and any residual petroleum ether may be suitably volatilized in vacuo at 25° C. (12–15 mm.). The dihydrovitamin $K_1$ may be dissolved thereafter in dry triethylamine or dry pyridine, preferably under a nitrogen atmosphere, and the solution filtered from any insoluble inorganic impurities.

The dihydrovitamin $K_1$ obtained in this manner is reacted with phosphorous oxychloride in dry triethylamine or dry pyridine, which are catalysts for the reaction, at about 0° to 5° C., preferably under a nitrogen atmosphere. The presence of nitrogen will exclude undesirable air and moisture from interfering with the reaction. Upon completion of the reaction, the excess triethylamine or pyridine as well as the excess phosphorous oxychloride are suitably removed in vacuo. The dihydrovitamin $K_1$ diphosphate tetrachloride residue is then treated with ice water to form the diphosphoric acid.

To purify the diphosphoric acid, the pH of the aqueous solution is adjusted to about 6 or higher with alkali, such as 30% sodium hydroxide or potassium hydroxide solution, and the resulting alkaline solution is extracted with ether to remove non-acidic material and any attendant vitamin $K_1$, and then acidified to about pH 1 and extracted with ether. Upon evaporation of the combined ether extracts, the residue may be finally dried by azeotropic distillation in vacuo with benzene.

A simpler purification step which may be alternatively employed comprises treating the ether extracted alkaline solution directly with a cation exchange resin such as IR–120, suspended in a suitable medium such as alcohol. The filtrate and alcohol washings obtained after removal from the ion exchange resin are evaporated to dryness.

The diphosphoric acid purified by either of the above procedures may be used directly for the conversion in good yields to the di-alkali metal and tetra-alkali metal salts.

Consequently, in accordance with the process of the present invention, the purified dihydrovitamin $K_1$ diphosphoric acid is dissolved in a lower alkanol such as methanol, ethanol, propanol, isopropanol, butanol, isobutanol, etc., preferably under nitrogen, and any insolubles which form are filtered. The alcoholic filtrate is treated at room temperature with a corresponding alkali metal alkoxide in a solution of the same alcohol used to dissolve the diphosphoric acid. For example, sodium methoxide may be used with methanol, sodium ethoxide with ethanol, sodium propoxide with propanol, sodium butoxide with butanol, potassium isopropoxide with isopropanol, etc., for conversion of the corresponding alcoholic solution of the diphosphoric acid to dihydrovitamin $K_1$ diphosphate di-alkali metal salt or dihydrovitamin $K_1$ diphosphate tetra-alkali metal salt.

The alcoholic suspension of dihydrovitamin $K_1$ diphosphate di-alkali metal or tetra-alkali metal salt obtained may be conveniently recovered at room temperature by an addition of an ether such as diethyl ether under anhydrous conditions. The solid di-alkali metal or tetra-alkali metal salt readily precipitates, is collected by suitable means such as filtration, and is isolated as a substantially pure dried product.

In order to convert the dihydrovitamin $K_1$ diphosphoric acid to the corresponding di-alkali metal salt, two moles of alkali metal alkoxide are necessary per mole of the diphosphoric acid. In like manner, in order to convert the dihydrovitamin $K_1$ diphosphoric acid to the tetra-alkali metal salt, four moles of alkali metal alkoxide are necessary per mole of the diphosphoric acid.

In this connection, to determine the amount of alcoholic alkali metal alkoxide solution (for example, in about 1% strength w/v) required for the conversion of a given batch of diphosphoric acid to the di-alkali metal derivaltive, an aliquot (for example, 10 ml.) of the alcoholic solution of the free diphosphoric acid is diluted with an equal volume of water. From the amount of the alkoxide solution (which should be protected from air and moisture) needed to neutralize two hydroxy groups, the amount of the same alkoxide solution needed for the remainder of the batch (to which no water is added) may be calculated.

In the case of the tetra-alkali metal salt, a similar aliquot of the alcoholic solution of the free diphosphoric acid is diluted with an equal volume of water. From the amount of the alkoxide solution (of similar strength w/v) required to neutralize all four acidic hydroxy groups, the amount of the same alkoxide solution required for the remainder of the batch (to which no water is added) may be found. This amount should be two times the molar amount required for the conversion to the di-alkali metal salt.

The temperature to be used for the conversion of the diphosphoric acid to the di-alkali metal and tetra-alkali metal salts is not critical and may range between 0° C. and 50° C., although room temperature is preferred. The reaction of dihydrovitamin $K_1$ and phosphorous oxychloride is performed in the cold, temperatures ranging between 0° C. and 15° C., however, being preferred.

While best results have been achieved in the reaction between dihydrovitamin $K_1$ and phosphorous oxychloride to form the diphosphate tetrachloride using triethylamine, which is therefore preferred as catalyst, satisfactory results may also be had using pyridine as catalyst. These catalysts are water soluble and hence are separated from the diphosphoric acid by ether extraction of the aqueous acid reaction solution, or by treatment of the ether extracted alkaline solution with a cation exchange resin material as mentioned above.

Any cation exchange resin may be used in the treatment of the alkaline solution of the diphosphoric acid for complete removal of unwanted triethylamine, pyridine and alkali metal cations. Among the suitable resins which may be employed for this purpose are "Amberlite IR–100", "Amberlite IR–105," and "Amberlite IR–120," products of Rohm & Haas Co.; "Zeokarb," a product of Permutit Co.; and "Duolite C–10" and "Duolite C–20," products of Chemical Process Co.

The following examples are set forth for the purpose of illustration only, and it is to be understood that the present invention is not limited thereto.

*Example I.—Preparation of Dihydrovitamin $K_1$ Diphosphate Disodium Salt*

To prepare dihydrovitamin $K_1$ for a run, the petroleum ether, under which the crude waxy-white dihydrovitamin $K_1$ (of about 70% to 75% purity) and anti-oxidant therefor are stored, is decanted, and residual petroleum ether is removed in vacuo, affording a gray solid with traces of dark material (presumed to be the quinhydrone). In a nitrogen atmosphere, 350 ml. of triethylamine (dried over KOH pellets for 24 hours) is added to the crude dihydrovitamin $K_1$ and a dark solid (inorganic material) settles from the solution of the dihydrovitamin $K_1$. The supernatant solution, which should be protected from moisture, contains 18.8 g. (0.042 mole) of dihydrovitamin $K_1$.

The concentration of the dihydrovitamin in the amine cannot be directly determined because of the presence of the anti-oxidant, but may be determined indirectly by measuring the amount of vitamin $K_1$ which can be obtained from an aliquot. A 5.0 ml. aliquot of the solution is taken to dryness in vacuo and the residue is dissolved in 15 ml. of ether. The solution is treated with 0.83 g. of silver oxide and 0.83 g. of magnesium sulfate. After collecting and thoroughly washing the solids, the solution is taken to dryness in a low-actinide flask, and the residual yellow oil is dissolved in 25.0 ml. of isooctane. The amount of dihydrovitamin $K_1$ in the amine solution is calculated from the extinction of the isooctane solution of vitamin $K_1$ at 248 m$\mu$ (E%—423 for pure vitamin $K_1$).

A clear yellow solution of 18.8 g. (0.042 mole) of dihydrovitamin $K_1$ prepared in the above manner in 350 ml. of dry triethylamine is added dropwise with vigorous stirring in a nitrogen atmosphere to a cold (5° C.) mixture of 70 ml. (0.078 mole) of phosphorous oxychloride in 350 ml. of dry triethylamine (similarly dried over KOH pellets) in a 2-liter round-bottomed 3-necked flask fitted with a stirrer, a dropping funnel and a thermometer.

Prior to the dihydrovitamin $K_1$ addition, the phosphorous oxychloride solution is prepared in the flask by adding the phosphorous oxychloride to the triethylamine with ice bath cooling and stirring. An orange solution containing some highly colored solid material (which is believed to be a complex), is obtained in this manner.

During the 45 minute addition period of the dihydrovitamin $K_1$ solution to the phosphorous oxychloride solution, the temperature of the exothermic reaction is maintained at 18° C. to 20° C. with the aid of an ice water bath. The dropping funnel is rinsed with 20 ml. of triethylamine, and the reaction mixture, an amber solution in which is suspended crystalline material, is stirred for 30 minutes at room temperature (27° C.). The excess of triethylamine and phosphorous oxychloride is removed in vacuo (water bath at 45° C. as source of heat) with stirring, affording an orange gummy mass.

With ice bath cooling and stirring, 1000 ml. of a water and ice slurry is cautiously added to the gummy residue. After stirring for 1 hour, the pH of the resulting orange solution and yellow oil is adjusted from less than 2 to 9.3 (Beckmann pH meter) by the addition of 186 ml. of 30% sodium hydroxide solution. The amber solution is extracted with five portions (350 ml. each) of ether. (The extraction of non-acidic material is continued until the final portion of ether exhibits no absorption on an ultraviolet scanner.) Any vitamin $K_1$ in the initial triethylamine solution would be present in these ether extracts.

To the remaining aqueous solution, 200 ml. of ether are added and the pH is adjusted to 1.0 (Beckmann pH meter) with 83 ml. of cold concentrated hydrochloric acid. The layers are separated, and the amber aqueous solution is extracted with 3 portions (350 ml. each) of ether. The final extract exhibits no ultraviolet absorption. The ether extracts are collected and the ether is removed from the combined orange extract in vacuo. An amber oil is obtained which is dried by azeotropic distillation in vacuo (oil pump or aspirator) with 4 portions (50 ml. each) of benzene. The resulting tan solid amounts to 29.05 g.

The solid is dissolved in 100 ml. of methanol, the solution is filtered in the present of a layer of Supercel on the filter, and the residue is washed to give a final volume of 140 ml. A 135 ml. aliquot of the clear amber solution is treated with 90.0 ml. of a methanolic sodium methoxide solution prepared by dissolving about 6 g. of commercial sodium methoxide in 120 ml. of methanol. The amount of sodium methoxide solution thus required is determined in the following manner:

A solution of about 6 g. of commercial sodium methoxide in 120 ml. of methanol is prepared (Solution A), and a 5.0 ml. aliquot of this solution is diluted with 50.0 ml. of methanol (Solution B.) The methoxide solutions must be protected from carbon dioxide and Solution A from moisture as well. A 4.0 ml. aliquot of the dihydrovitamin $K_1$ diphosphate solution diluted with 10.0 ml. of water is titrated to pH 6.6 to 7.0 (Beckmann pH meter) with 29.14 ml. of Solution B. From this value is calculated the amount of Solution A which is required to convert the dihydrovitamin $K_1$ disphosphate in the batch to the disodium salt. The amount of Solution A required is in the order of 0.18 g. of sodium methoxide per gram of solid dihydrovitamin $K_1$ diphosphoric acid.

The resulting solution of disodium salt in methanol, which must be protected from moisture and carbon dioxide, is added dropwise with vigorous stirring to 2000 ml. of ether. The presence of a large volume of ether is advisable to prevent the separation of an oil at this point. The tan solid formed is allowed to settle and the yellow supernatant liquor is decanted off. The solid is collected on a filter, washed copiously with ether, and allowed to dry in a vacuum desiccator. The dihydrovitamin $K_1$ diphosphate disodium salt, an off-white powder amounts to 27.8 g.

This product has the following ultraviolet absorption spectra data:

$\lambda_{max.}^{MeOH} = 2,360$ A.   E% (MeOH) = 962 or E = 63,100

$\lambda_{max.}^{H_2O} = 2,335$ A.   E% ($H_2O$) — 867 or E = 56,900

*Example II.—Preparation of Dihydrovitamin $K_1$ Diphosphate Disodium Salt*

A pale amber solution containing 12.5 g. of dihydrovitamin $K_1$ in 57.0 ml. of dry pyridine prepared by the procedure of Example I is added slowly with vigorous stirring in a nitrogen atmosphere to a cold (0° C.), clear, colorless solution of 45.5 ml. of freshly distilled phosphorous oxychloride in 57.0 ml. of dry pyridine. The reaction flask is immersed in an ice bath and the addition is carried out at a rate to hold the temperature below 10° C. (about 15 to 20 minutes. Pyridine hydrochloride separates during the addition. The dropping funnel is washed with 15 ml. of pyridine and the washings are added dropwise to the reaction mixture. The ice bath is removed and the reaction mixture is allowed to stir at room temperature for 1 hour. The unchanged pyridine and phosphorous oxychloride are removed in vacuo (12 to 13 mm.) with efficient stirring (water bath at 50° to 55° C. as source of heat).

The residual yellow gum (dihydrovitamin $K_1$ diphosphate tetrachloride) is cooled to 0° C., and 1.5 liters of cold water are added with care while keeping the flask immersed in an ice bath. The cooling bath is removed and the mixture stirred for 2 hours more. The reaction mixture is then stored at 5° C. overnight. The supernatant liquid is removed by decantation from the dihydrovitamin $K_1$ diphosphoric acid and 50 ml. of water are added. The pH is adjusted to 8.6 (pH meter) with 30% aqueous sodium hydroxide. The basic solution is extracted 3 times with 150 ml. portions of ether to remove any neutral material. The aqueous layer is chilled to about 2° to 5° C., covered with 150 ml. of ether and acidified to a pH of 1 (pH meter) with concentrated hydrochloric acid. The ether layer is separated and the aqueous phase is extracted with 3 portions (150 ml. each) of ether. The combined ethereal extracts are washed several times with water. Any emulsions which occur at this time may be broken by the addition of a limited amount of a saturated salt solution. The ethereal layers are concentrated to dryness. The product is dried by twice distilling azeotropically with benzene (bath temperature 45° C., 12 mm.).

The dried product is redissolved in 2.5 normal sodium hydroxide. Enough base is used to bring the pH of the solution to 8.4 (pH meter). The solution is washed with about 3 portions (100 ml. each) of ether. The basic solution is chilled to 2° C. and adjusted to pH 1 with 2.5 normal hydrochloric acid. The acidic solution is extracted 3 times with ether (150 ml. portions). The ethereal solutions are combined and washed twice with 100 ml. of 2.5 normal hydrochloric acid, then with water, and finally with saturated salt solution. The ethereal solution is then treated with 95 ml. of IR–120 suspended in 150 ml. of methanol. Additional amounts of ether are used to complete the transfer of the resin to the reaction mixture. The mixture is stirred for 1½ hours and then filtered. The resin is washed thoroughly with ether, and the combined filtrate and washings are evaporated to dryness in vacuo giving 6.20 g. of dihydrovitamin $K_1$ disphosphoric acid:

$\lambda_{max.}^{MeOH} = 2,340$ m$\mu$. E% = 1,059

5.42 g. (0.00825 mole) of the free acid are dissolved in 43.5 ml. of methanol and allowed to stand under nitrogen overnight. Insolubles which settle are removed by filtration and washed to give 55 ml. of filtrate. The filtrate is treated with exactly 0.017 mole of sodium methoxide in methanol, the quantity of sodium methoxide being determined in accordance with the procedure of Example I.

The resulting suspension of the disodium salt, which should be protected from carbon dioxide and moisture, is stirred at room temperature, and 700 ml. of ether are added through a dropping funnel. Precaution should be taken at this point to avoid contamination with moisture. The suspension of the pale tan solid is stirred for 1 hour and allowed to settle for at least 24 hours at room temperature. The solid is collected by filtration, washed free of methaol with ether, and dried to constant weight in a vacuum desiccator to yield 5.5 g. of a pale tan product, dihydrovitamin $K_1$ disphosphate disodium salt.

*Example III.—Preparation of Dihydrovitamin $K_1$ Diphosphate Tetrasodium Salt*

14.5 g. (0.0238 mole) of the solid dihydrovitamin $K_1$ diphosphoric acid obtained by the procedure of Example I are dissolved in 50 ml. of methanol, filtered, and washed to give 75 ml. of filtrate. The filtrate is treated with exactly 0.095 mole of sodium methoxide in methanol solution. The amount of sodium methoxide solution required is twice that required for the conversion to the disodium salt as in Example I. Hence, 0.35 g. of sodium methoxide per gram of solid dihydrovitamin $K_1$ diphosphoric acid are needed for the conversion to the tetrasodium salt.

The resulting solution is treated with a large volume of ether in accordance with the procedure of Example I and the solid dihydrovitamin $K_1$ diphosphate tetrasodium salt is isolated as a dried product.

*Example IV.—Preparation of Dihydrovitamin $K_1$ Diphosphate Dipotassium Salt*

35.0 g. (0.0574 mole) of the solid diphosphoric acid obtained by the procedure of Example I are dissolved in 120 ml. of isopropanol, filtered, and washed with isopropanol. The filtrate is treated with about 246 ml. of an 0.462 molar isopropanolic potassium isopropoxide solution which may be prepared by dissolving 18.1 g. of potassium in 1 liter of isopropanol. The resulting solution is treated with a large volume of ether as in Example I and the solid dihydrovitamin $K_1$ disphosphate dipotassium salt which precipitates is isolated as a dried product.

*Example V.—Preparation of Dihydrovitamin $K_1$ Diphosphate Tetrapotassium Salt*

29.05 g. (0.047 mole) of the solid diphosphoric acid obtained by the procedure of Example I are dissolved in 100 ml. of isopropanol and filtered. The filtrate is treated with about 410 ml. of a 0.462 molar isopropanolic potassium isopropoxide solution which may be prepared as described in Example IV. The amount of the potassium isopropoxide solution required is about twice that required for the conversion to the dipotassium salt. The resulting solution is treated with a large volume of ether as in Example IV and the solid dihydrovitamin $K_1$ diphosphate tetrapotassium salt which precipitates is isolated as a dried product.

*Example VI.—Preparation of Dihydrovitamin $K_1$ Diphosphate Tetrasodium Salt*

297 g. of solid dihydrovitamin $K_1$ diphosphoric acid such as that prepared by the procedure of Example 2 are dissolved in 3000 ml. of absolute ethanol and this solution is added to 972 ml. of a cooled (about 5° C.) solution (1 Normal) of sodium ethoxide in absolute ethanol. The mixture is allowed to stand for several hours with cooling to complete crystallization. Upon separation from the solution by filtration, the crystals are thoroughly washed with absolute ethanol, acetone, and finally anhydrous ether. The product is dried at room temperature in vacuo, and amounts to 263 g. of the tetrasodium salt, having the following physical data:

*Analysis.*—Calcd. for $C_{31}H_{46}O_8P_2Na_4$ (700.64): C, 53.14; H, 6.62. Found pig-dried at 100° C. for 3 hours): C, 53.11; H, 7.10.

Ultraviolet absorption spectra:

$\lambda_{max.}^{MeOH} = 3,250; 3,100; 2,950; 2,370$ (A.)

E% = 12.5; 37.5; 66.6; 863

While the foregoing specification and examples have been set forth to illustrate the present invention, it will be readily apparent that various changes and modifications may be made without departing from the spirit and scope of the invention which is to be limited only by the scope of the appended claims.

What is claimed is:

1. In a process for the production of dihydrovitamin $K_1$ diphosphate alkali metal salts by reaction of dihydrovitamin $K_1$ and phosphorous oxychloride in the cold in the presence of an amine catalyst to form dihydrovitamin $K_1$ diphosphate tetrachloride followed by hydrolysis of said tetrachloride in water to form dihydrovitamin $K_1$ diphosphoric acid, the improvement which comprises recovering and dissolving said acid in an alcohol, treating the alcoholic solution of said acid with an alcoholic solution of alkali metal alkoxide, contacting the resulting alcoholic solution with a substantial quantity of an ether to precipitate the alkali metal salt of dihydrovitamin $K_1$ diphosphoric acid and recovering the precipitated dihydrovitamin $K_1$ diphosphate alkali metal salt therefrom.

2. In a process for the production of dihydrovitamin $K_1$ diphosphate disodium salt by reaction of dihydrovitamin $K_1$ and phosphorous oxychloride in the cold in the presence of an amine catalyst to form dihydrovitamin $K_1$ diphosphate tetrachloride followed by hydrolysis of said tetrahydrochloride in water to form dihydrovitamin $K_1$ diphosphoric acid, the improvement which comprises recovering and dissolving said acid in methanol, treating the methanolic solution of said acid with a methanol solution of sodium methoxide, contacting the resulting methanolic solution with a substantial quantity of diethyl ether to precipitate the disodium salt of dihydrovitamin $K_1$ diphosphate and recovering the dihydrovitamin $K_1$ diphosphate disodium salt therefrom.

References Cited in the file of this patent

UNITED STATES PATENTS

| | | |
|---|---|---|
| 2,345,690 | Solmssen | Apr. 4, 1944 |
| 2,407,823 | Fieser | Sept. 17, 1946 |

OTHER REFERENCES

Isler et al.: Helv. Chim. Acta 37, 225–233 (1944).

FOREIGN PATENTS

| | | |
|---|---|---|
| 547,764 | Great Britain | Sept. 10, 1942 |